(12) United States Patent
Yaman et al.

(10) Patent No.: US 9,722,700 B2
(45) Date of Patent: Aug. 1, 2017

(54) WAVELENGTH DIVISION MULTIPLEXING SYSTEM AND METHOD INCLUDING WAVELENGTH MONITORING

(71) Applicants: NEC Laboratories America, Inc., Princeton, NJ (US); NEC Corporation, Tokyo (JP)

(72) Inventors: Fatih Yaman, Monmouth Junction, NJ (US); Shaoliang Zhang, Princeton, NJ (US); Ting Wang, West Windsor, NJ (US); Yoshihisa Inada, Tokyo (JP); Takaaki Ogata, Tokyo (JP)

(73) Assignee: NEC Corporation (JP)

( * ) Notice: Subject to any disclaimer, the term of this patent is extended or adjusted under 35 U.S.C. 154(b) by 118 days.

(21) Appl. No.: 14/807,446

(22) Filed: Jul. 23, 2015

(65) Prior Publication Data

US 2016/0028504 A1   Jan. 28, 2016

Related U.S. Application Data

(60) Provisional application No. 62/028,863, filed on Jul. 25, 2014.

(51) Int. Cl.
H04B 17/00 (2015.01)
H04B 10/079 (2013.01)
H04J 14/02 (2006.01)

(52) U.S. Cl.
CPC . *H04B 10/07957* (2013.01); *H04B 10/07955* (2013.01); *H04J 14/0221* (2013.01)

(58) Field of Classification Search
CPC ......... H04B 10/07957; H04B 10/07955; H04J 14/0221

USPC .......................................................... 398/34
See application file for complete search history.

(56) References Cited

U.S. PATENT DOCUMENTS

| | | | | |
|---|---|---|---|---|
| 5,894,362 A | * | 4/1999 | Onaka | H04B 10/077 398/34 |
| 6,289,028 B1 | * | 9/2001 | Munks | G02B 5/20 372/20 |
| 7,039,319 B1 | * | 5/2006 | Moulton | H04B 10/506 398/196 |
| 8,928,885 B1 | * | 1/2015 | Luo | G01N 21/3504 356/437 |
| 2002/0048063 A1 | * | 4/2002 | Jung | H04B 10/506 398/95 |

(Continued)

OTHER PUBLICATIONS

Minardi, "Adaptive Crosstalk Cancellation and Laser Frequency Drift Compensation in Dense WDM Networks." IEEE journal of lightwave technology, vol. 13, No. 8, Aug. 1995.*

*Primary Examiner* — Juan A Torres
(74) *Attorney, Agent, or Firm* — Joseph Kolodka

(57) ABSTRACT

A wavelength division multiplexing system and method featuring a wavelength monitor that is configured to receive a portion of a combined signal of wavelength division multiplexing channels and determine the wavelengths of each channel or the guardband between each channel in the combined signal. The wavelength monitor determines if there is excess laser drift for each channel in the combined signal. If excess laser drift is determined, feedback is sent to the transmitter for the signal with excess laser drift and the signal is adjusted to produce a target wavelength. The wavelength monitor may utilize optical intradyning in order to monitor the wavelengths of each channel in the combined signal.

17 Claims, 4 Drawing Sheets

(56) References Cited

U.S. PATENT DOCUMENTS

| | | | | |
|---|---|---|---|---|
| 2002/0154662 A1* | 10/2002 | Turpin | ............ | G02B 5/284 |
| | | | | 372/20 |
| 2005/0073690 A1* | 4/2005 | Abbink | ............ | G01J 9/02 |
| | | | | 356/451 |
| 2008/0152362 A1* | 6/2008 | Koc | ............ | H04B 10/61 |
| | | | | 398/205 |
| 2009/0060497 A1* | 3/2009 | Way | ............ | H04B 10/675 |
| | | | | 398/27 |

* cited by examiner

WAVELENGTH DIVISION MULTIPLEXING SYSTEM AND METHOD INCLUDING WAVELENGTH MONITORING

RELATED APPLICATION INFORMATION

This application claims priority to provisional application Ser. No. 62/028,863, filed on Jul. 25, 2014, incorporated herein by reference.

BACKGROUND

Technical Field

The present invention relates to fiber optic communication systems, and more particularly, wavelength division multiplexing systems.

Description of the Related Art

In wavelength division multiplexing (WDM) systems, multiple transmitters having tunable lasers are combined and transmitted together over an optical fiber of a communications system using arrayed waveguide gratings, couplers or similar components. However, laser drift which occurs from fluctuations in the wavelengths generated by the tunable lasers results in cross-talk between the WDM channels which leads to significant deterioration in signal quality.

In order to avoid deterioration of the signal quality, the WDM channels may be spaced apart to provide a minimal guardband. The minimal guardband reduces the possibility that the WDM channels will overlap due to laser drift. However, increased spacing of the WDM channels decreases the number of WDM channels that are able to be accommodated in an optical fiber which increases the cost for each bit transmitted over the system.

SUMMARY

A method for transmitting signals in a WDM system, including the step of inputting a signal from a combined signal of WDM channels for a WDM system into a wavelength monitor. The wavelengths of each of the combined WDM channels are monitored by the wavelength monitor. The wavelength monitor determines whether each of the wavelengths exhibit excess laser drift. Feedback is then sent to a transmitter for a WDM channel having excess laser drift. The feedback is received by the transmitter and the wavelength for the signal is modified by the transmitter so that the wavelength no longer exhibits excess laser drift.

A WDM system featuring wavelength monitoring includes a plurality of transmitters having tunable lasers. Each of the plurality of transmitters are configured to produce signals having a distinct wavelength from a signal produced by any other transmitter. The system also includes a multiplexer configured to combine the signals from the transmitters in order to form a combined signal having a plurality of wavelengths. A wavelength monitor is configured to receive a portion of the combined signal and determine the wavelengths of each of the signals of the combined signal or a guardband between adjacent signals in the combined signal. The wavelength monitor includes a determination module configured to determine if there is excess laser drift for each signal in the combined signal. If the determination module determines that there is excess laser drift for the signal, each of the plurality of transmitters are configured to correct the wavelength of the signal produced thereby.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, systems and methods are provided for a WDM system which prevents the overlap of channels and allows a WDM system to operate effectively with a minimal guardband. The systems and methods include a wavelength monitor which is configured to receive a small tapped portion of the combined signal of WDM channels and accurately monitor the wavelengths of each WDM channel. The wavelength monitor determines if there is excess laser drift for a WDM channel. If there is excess laser drift, a signal is sent to the transmitter which then adjusts the laser to produce a signal having a target wavelength.

Embodiments described herein may be entirely hardware, entirely software or including both hardware and software elements.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
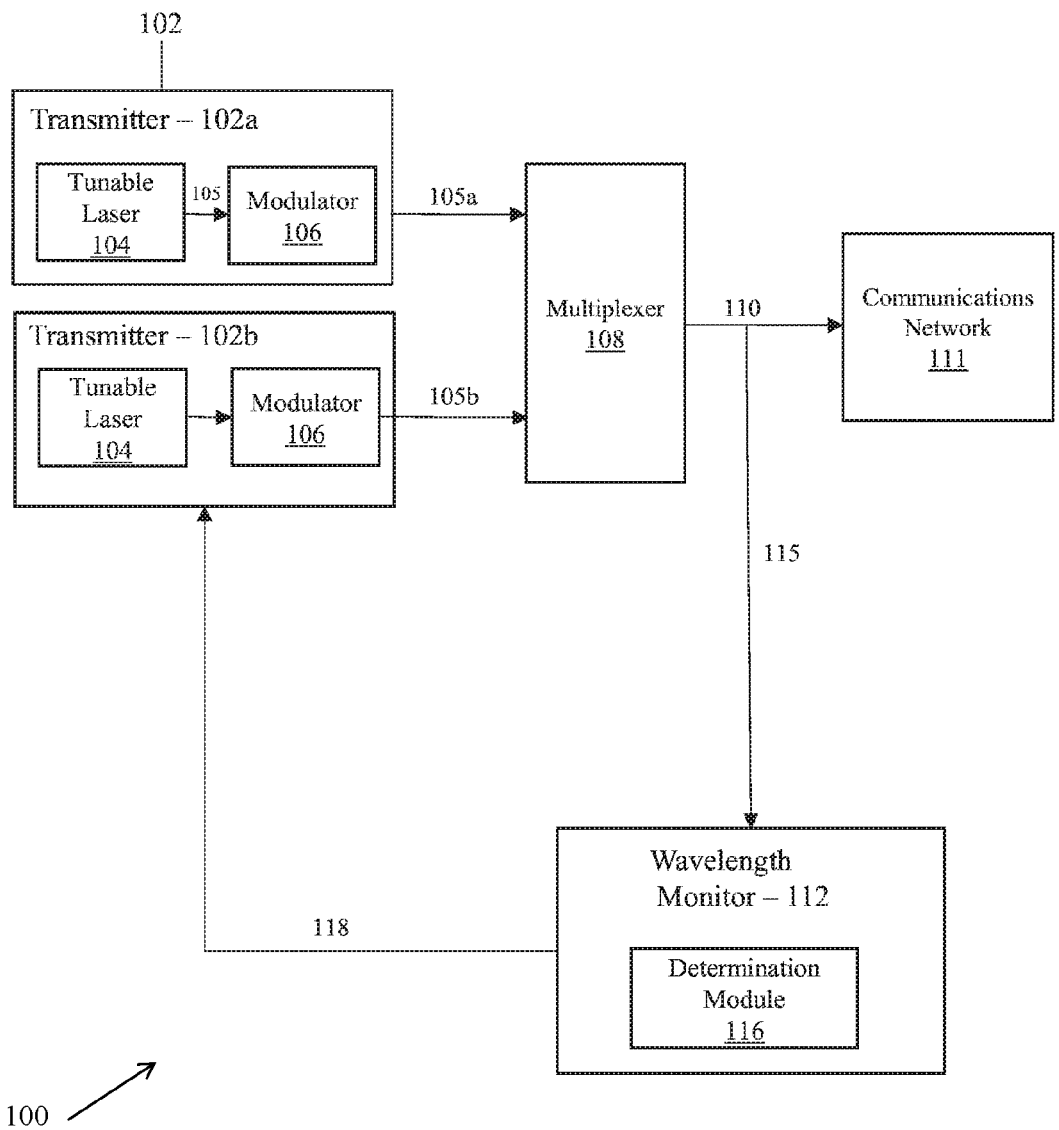
FIG. 1 is a block/flow diagram illustratively depicting a WDM system in accordance with the present principles.

Referring now to FIG. 1, a block/flow diagram illustratively depicting a WDM system is shown in accordance with one embodiment of the present principles. The WDM system includes a plurality of transmitters 102 having tunable lasers 104 that are configured to produce laser light signals 105 having a specific wavelength. The signal 105 produced by each of the tunable lasers is modified by modulators 106. In one embodiment, the modulators are differential quadrature phase shift keying (DPQPSK) modulators.

Figure 2:
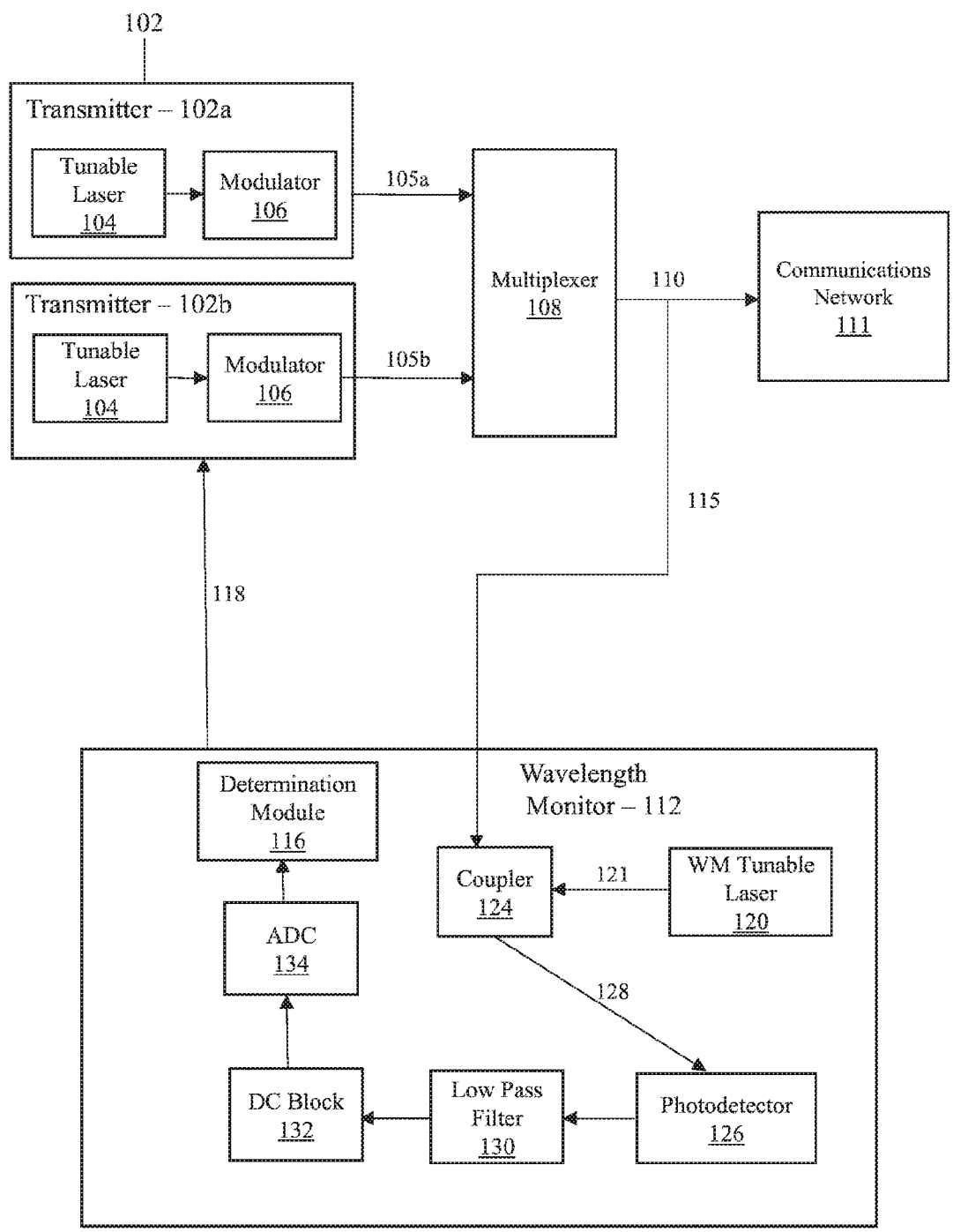
FIG. 2 is a block/flow diagram illustratively depicting one embodiment for the WDM system in accordance with the present principles.

The signals 105 from the plurality of transmitters 102 having tunable lasers 104 represent individual WDM channels. In FIGS. 1-2, the plurality of transmitters 102 are shown for illustrative purposes only as comprising first 102a and second 102b transmitters which produce first 105a and second 105b signals. However, a WDM system may have a substantially greater number of transmitters and signals for the WDM channels. The plurality of signals 105 are combined by a multiplexer 108 such as arrayed waveguide gratings (AWG), couplers or other known devices into a combined signal 110 which includes each of the WDM channels of the system 100. The combined signal 110 is transmitted to a communications network 111 having optical fibers.

The system 100 is configured to tap a small portion 115 of the combined signal 110 and input this portion into a wavelength monitor 112. For example, in one embodiment, the system 100 is configured to tap approximately 1% of the combined signal 110 and input the tapped portion into the wavelength monitor 112. The wavelength monitor 112 is configured to analyze the small portion 115 of the combined signal and monitor the wavelengths of each (or one or more) of the WDM channels in the combined signal 110. The wavelength monitor 112 is configured to determine whether the signal 105 of each WDM channel is exhibiting excess laser drift.

In one embodiment, the determination of whether the amount of laser drift constitutes excess laser drift is determined by a determination module 116. The determination module 116 is configured to compute the difference between the current wavelength of the WDM channel with a target wavelength for that channel. In another embodiment, the determination module is configured to determine the amount of laser drift by determining the current guardband between WDM channels and comparing it to a target guardband.

The determination module 116 may include field-programmable gate arrays (FPGAs) or other known hardware for computing the amount of laser drift. The determined amount of laser drift may be compared to a predetermined maximum drift value. The determination module 116 is configured to determine that there is excess laser drift if the computed amount of laser drift is greater than the predetermined maximum drift value.

The system 100 is configured to send feedback 118, such as a warning signal to a transmitter 102 for any signal that exhibits excess laser drift. In the embodiment shown in FIG. 1, the determination module 116 sends feedback 118 to the second transmitter 102b. The transmitter 102 receives the feedback 118 and is configured to correct the signal by modifying the wavelength of the signal 105 so that it does not exhibit excess laser drift. In one embodiment, the signal of a WDM channel is adjusted so that the wavelength is equal to the target wavelength. The target wavelength may be predetermined. Alternatively, a signal of the WDM channel may be adjusted so that the gap between the WDM channel and an adjacent channel is equal to a predetermined target guardband.

Referring now to FIG. 2, a block/flow diagram illustratively depicting a WDM system is shown in accordance with one embodiment of the present principles. In this embodiment, the wavelength monitor 112 is configured to monitor the wavelengths of the individual WDM channels by optical intradyning. In this embodiment, the wavelength monitor includes a tunable laser 120 (the "WM tunable laser"). The WM tunable laser 120 is configured to produce a laser light signal 121. A coupler 124 is configured to combine the portion 115 of the combined signal inputted into the wavelength monitor 112 and the signal 121 from the WM tunable laser in order to form a coupled signal 128.

A photodetector 126 such as a photodiode is configured to detect the coupled signal 128. In certain embodiments, a balanced photodiode pair may be used instead of a single photodiode in order to provide an improved signal to noise ratio. The balanced photodiode pair helps reduce the needed power level for the WM tunable laser 120.

The wavelength monitor 112 includes a low pass filter 130 which receives the coupled signal 128 after the signal passes the photodetector 126. The low pass filter 130 is configured to allow passage of portions of the coupled signal 128 having a frequency lower than a cutoff frequency while attenuating higher frequencies.

The wavelength monitor 112 further includes a direct current (DC) block 132 which is configured to receive the coupled signal after it passes the low pass filter 130. The DC block 132 is configured to prevent the flow of portions of the coupled signal 128 having direct current frequencies but provides minimum interference to radiofrequency signals.

The wavelength monitor 112 includes a low speed analog to digital converter (ADC) 134 which is configured to receive the coupled signal after it passes the DC block 132. In some embodiments, the wavelength monitor 112 may not include the low pass filter 130 if the ADC has an adequate analog filter or if the photodetector 126 has a sufficiently low bandwidth.

In a preferred embodiment, the power of the WM tunable laser 120 is significantly larger than the power of the small portion 115 of the combined signal inputted into the wavelength monitor. The significantly larger power of the WM tunable laser 120 allows the dominant signal registered by the ADC 134 to be the beating component between the WM tunable laser signal 121 and the signal of the small portion 115 of the combined signal inputted into the wavelength monitor that is within the bandwidth of the low pass filter 130. The power level of the signal that immediately surrounds the wavelength of the WM tunable laser signal 121 is measured with a resolution that is provided by the width of the low pass filter 130.

The wavelength monitor 112 is configured to analyze the coupled signal 128 by sweeping the wavelength of the WM tunable laser 120 across the spectrum of WDM channels and recording the power level of the signal at each wavelength location. This provides a high resolution spectral profile for each of the WDM channels within the coupled signal 128. Importantly, the wavelength shift of the WM tunable laser is typically very accurate. Accordingly, the WM tunable laser 120 may exhibit wavelength drift which causes the absolute wavelength of the WDM channel determined by the wavelength monitor 112 to be inaccurate. However, the shift of the WM tunable laser is very accurate as it is swept across the spectrum of the WDM channels. Therefore, the measure of the guardband between WDM channels will be very accurate even if the WM tunable laser signal 121 exhibits wavelength drift. This allows the monitoring of the wavelengths of each of the WDM channels by the wavelength monitor to be very precise even if the WM tunable laser signal 121 exhibits wavelength drift. Therefore, the configuration of the wavelength monitor 112 which monitors the WDM channels by intradyning provides accurate and reliable monitoring while featuring a relatively low cost and low complexity.

The system 100 effectively reduces laser drift and allows the wavelengths of the combined signal 110 in the WDM system to be tightly packed together without the risk of overlap of the channels. This provides a marked improvement in the capacity of the WDM channels in a single optical fiber while providing high quality signals for the WDM channels.

Figure 3:
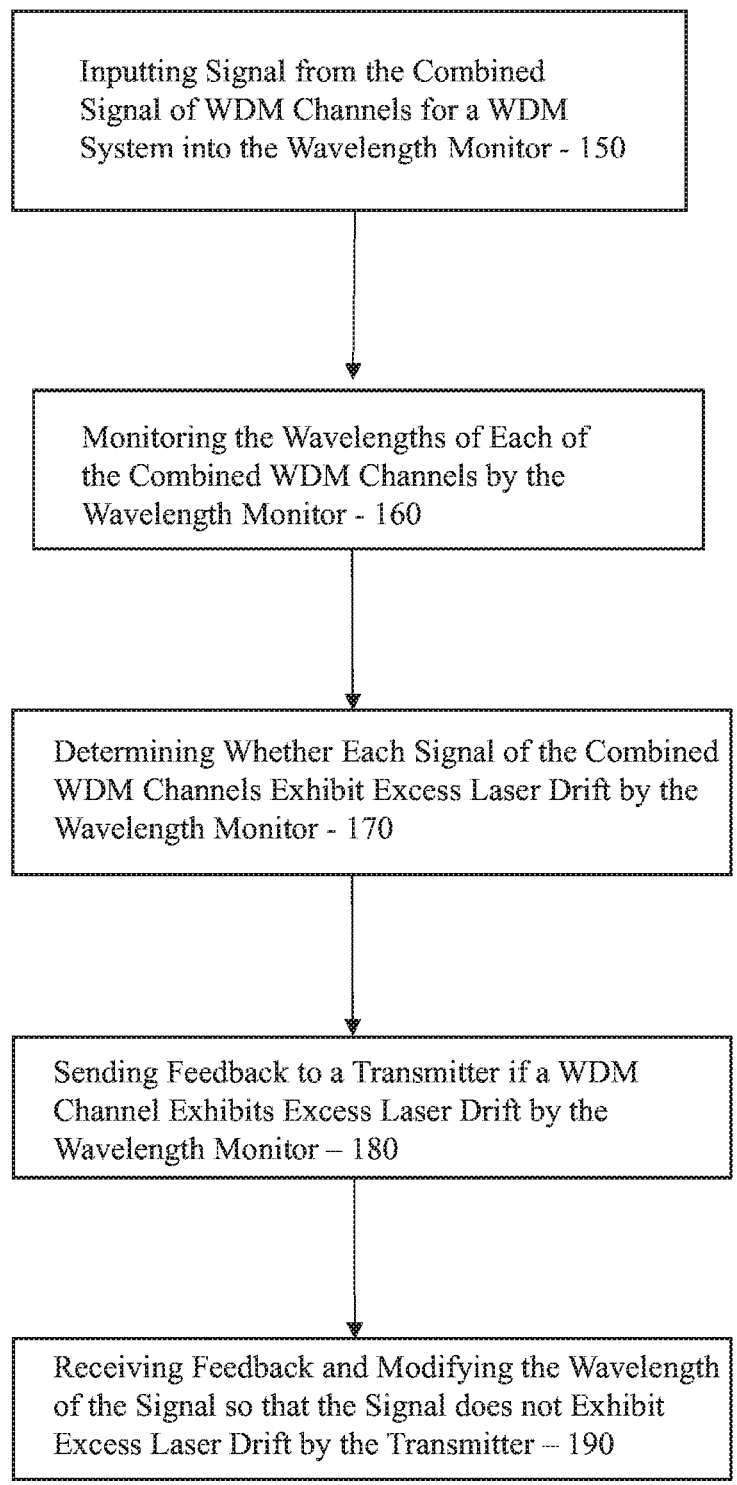
FIG. 3 is a block/flow diagram illustratively depicting a method of operation of the WDM system in accordance with the present principles.

Referring now to FIG. 3, a block/flow diagram illustratively depicting a method for preventing overlap of channels in a WDM system is shown in accordance with the present principles. In block 150, a signal is input from the combined signal of WDM channels for a WDM system into the wavelength monitor 112. In block 160, the wavelength monitor 112 monitors wavelengths of each of the combined WDM channels. The wavelength monitor may monitor the wavelengths of each of the combined WDM channels by comparing a measured wavelength with a target wavelength or by measuring the guardband between WDM channels and comparing it with a target guardband.

In block 170, the wavelength monitor 112 determines whether each of the signals exhibits excess laser drift. If the wavelength monitor 112 determines that there is excess laser drift, the monitor sends feedback 180, such as a warning signal, to the transmitter for the laser that exhibits excess laser drift. In block 190, the transmitter 102 receives the feedback and modifies the wavelength of the signal so that the signal does not exhibit excess laser drift. In a preferred embodiment, the wavelength is adjusted by the transmitter 102 to be equal to a predetermined target wavelength.

Figure 4:
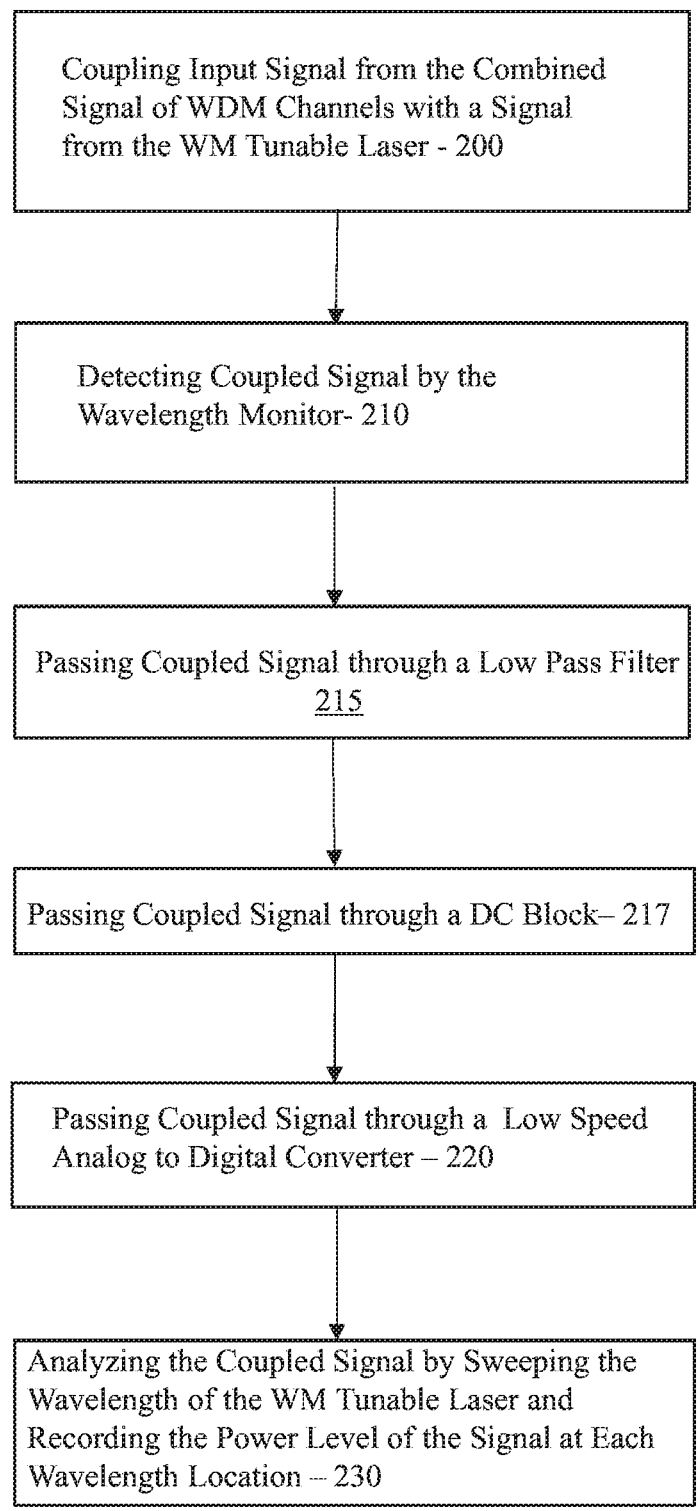
FIG. 4 is a block/flow diagram illustratively depicting one embodiment for the method of operation of the WDM system in accordance with the present principles.

Referring now to FIG. 4, a block/flow diagram illustratively depicting one embodiment for the method of operation of the WDM system is shown in accordance with the present principles. In the embodiment shown in FIG. 4, the wavelength monitor 112 monitors the wavelengths of the individual WDM channels by optical intradyning, as previously discussed with respect to the system. In block 200, the signal 115 from the combined signal of WDM channels input into the wavelength monitor is coupled with a signal 121 from a tunable laser of the wavelength monitor to form a coupled signal 128.

In block 210, the coupled signal 128 is detected by a photodetector such as a photodiode or a balanced photodiode pair. In block 215, the coupled signal 128 is passed through a low pass filter 130. In block 217, the coupled signal 128 is passed through a DC block 132.

In block 220, the coupled signal 128 passes through a low speed analog to digital converter and is converted into a digital signal.

As previously discussed, in certain embodiments, the coupled signal may not need to be passed through a low pass filter 130, such as if the ADC 134 has an adequate analog filter or if the photodetector 126 has a sufficiently low bandwidth.

The wavelength monitor 112 analyzes 230 the coupled signal 128 by sweeping the wavelength of the WM tunable laser 120 across the spectrum of WDM channels and recording the power level of the signal at each wavelength location. This provides a high resolution spectral profile for each of the WDM channels within the coupled signal 128.

The methods effectively reduce laser drift and allows the wavelengths of the combined signal 110 in the WDM system to be tightly packed together while preventing overlap of the channels.

While the above configuration and steps are illustratively depicted according to one embodiment of the present principles, it is contemplated that other sorts of configurations and steps may also be employed according to the present principles.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for transmitting signals in a wavelength division multiplexing (WDM) system, comprising:
   inputting a signal from a combined signal of WDM channels for the WDM system into a wavelength monitor;
   monitoring wavelengths of each of the combined WDM channels by the wavelength monitor;
   determining whether each of the combined WDM channels exhibit excess laser drift by the wavelength monitor;
   sending feedback to a transmitter for a WDM channel having excess laser drift;
   receiving the feedback and modifying the wavelength by the transmitter so that the WDM channel no longer exhibits excess laser drift;
   coupling the signal from the combined signal of WDM channels input into the wavelength monitor with a signal from a tunable laser of the wavelength monitor to form a coupled signal;
   detecting the coupled signal by a photodetector; and
   converting the coupled signal by a low speed analog to digital converter;
   wherein the monitoring of the wavelengths is performed by analyzing the coupled signal across a spectrum of wavelengths for the WDM channels in the combined signal and determining a power level of the coupled signal at a plurality of wavelength locations.

2. The method for operation of a WDM system as recited in claim 1, wherein the wavelength monitor is configured to monitor the wavelengths of each of the combined WDM channels by performing optical intradyning.

3. The method of claim 1, further comprising the step of passing the coupled signal through a low pass filter after the coupled signal passes the photodetector.

4. The method of claim 1, wherein the tunable laser of the wavelength monitor has a greater power than a power of the signal from the combined signal received by the wavelength monitor.

5. The method of claim 1, wherein the transmitter is configured to correct the wavelength of the signal by adjusting the wavelength so that it is equal to a target wavelength or so a gap between the wavelength of the signal and a wavelength of an adjacent WDM channel is equal to a target guardband.

6. The method of claim 1, wherein the step of determining whether each of the wavelengths display excess laser drift is performed by a determination module which includes field-programmable gate arrays.

7. The method of claim 1, wherein a small portion of the combined signal of WDM channels for a WDM system is input into the wavelength monitor.

8. The method of claim 3, further comprising the step of passing the coupled signal through a direct current block after the coupled signal passes the low pass filter.

9. A wavelength division multiplexing (WDM) system featuring wavelength monitoring, comprising:
   a plurality of transmitters having tunable lasers, each of said plurality of transmitters being configured to produce signals having a distinct wavelength from a signal produced by any other transmitter;
   a multiplexer configured to combine the signals from the transmitters in order to form a combined signal having a plurality of wavelengths;
   a wavelength monitor configured to receive a portion of the combined signal and determine the wavelengths of each of the signals from the plurality of transmitters in the combined signal or a guardband between adjacent signals in the combined signal;
   said wavelength monitor including a determination module configured to determine if there is excess laser drift for each signal from the plurality of transmitters in the combined signal;
   each of said plurality of transmitters being configured to correct the wavelength of the signal produced thereby if the determination module determines that there is excess laser drift for the signal;
   a tunable laser configured to produce a signal;
   a coupler configured to combine the portion of the combined signal and the signal from the tunable laser to form a coupled signal;
   a photodetector configured to detect the coupled signal; and
   a low speed analog to digital converter;
   wherein wavelengths for each of the signals of the combined signal are determined by analyzing the coupled signal across a spectrum of the wavelengths for the signals in the combined signal and determining a power level of the coupled signal at a plurality of wavelength locations.

10. The system as recited in claim 9, wherein the wavelength monitor further includes a low pass filter which receives the coupled signal after the signal passes the photodetector.

11. The system as recited in claim 9, wherein the wavelength monitor further includes a direct current block which receives the coupled signal after the signal passes the low pass filter.

12. The system as recited in claim 9, wherein said photodetector comprises a balanced photodiode pair.

13. The system as recited in claim 9, wherein the tunable laser of the wavelength monitor has a greater power than a power of the portion of the combined signal received by the wavelength monitor.

14. The system as recited in claim 9, wherein the plurality of transmitters further include a modulator.

15. The system as recited in claim 9, wherein:
   the determination module is configured to send feedback to the transmitter when a signal exhibits excess laser drift; and
   each of the plurality of transmitters are configured to receive the feedback and correct the wavelength of the signal in response to the feedback.

16. The system as recited in claim 9, wherein the transmitter is configured to correct the wavelength of the signal by adjusting the wavelength so that it is equal to a target wavelength or so a gap between the wavelength of the signal and a wavelength of an adjacent WDM channel is equal to a target guardband.

17. The system as recited in claim 9, wherein the determination module includes field-programmable gate arrays for computing an amount of laser drift.

* * * * *